United States Patent [19]

Hulverson et al.

[11] 4,015,876
[45] Apr. 5, 1977

[54] WEDGE TYPE TRAILER BODY

[75] Inventors: Adrian F. Hulverson, Grosse Pointe Woods; Eugene Chosy, Grosse Pointe Farms, both of Mich.

[73] Assignee: Fruehauf Corporation, Detroit, Mich.

[22] Filed: May 11, 1972

[21] Appl. No.: 252,264

[52] U.S. Cl. .............................. 296/28 M; 52/483; 280/106 T
[51] Int. Cl.² ........................................ B62D 33/04
[58] Field of Search ............... 296/28 M, 36, 29; 280/106 T; 105/409; 52/90, 94, 282, 480, 481, 483, 495

[56] References Cited

UNITED STATES PATENTS

| | | | |
|---|---|---|---|
| 1,922,027 | 8/1933 | Carter | 296/28 M |
| 2,046,246 | 6/1936 | Clem | 52/495 X |
| 2,872,240 | 2/1959 | Bennett | 296/28 M |
| 3,376,063 | 4/1968 | Hulverson | 296/28 M |
| 3,393,920 | 7/1968 | Ehrlich | 280/106 T |

*Primary Examiner*—L. J. Paperner
*Attorney, Agent, or Firm*—Harness, Dickey & Pierce

[57] ABSTRACT

The disclosure relates to trailer or semi-trailer body of the wedge type having a horizontal roof and a rearwardly downwardly sloping floor providing a greater height at the rear opening than at the front. The body is of unique construction having the posts and front wall parallel to each other and at right angles to the underframing and lower rail. The roof and rear door frame are disposed at right angles to each other in horizontal and vertical respectively, the arrangement being such as to readily lend itself to mass production of the body.

6 Claims, 3 Drawing Figures

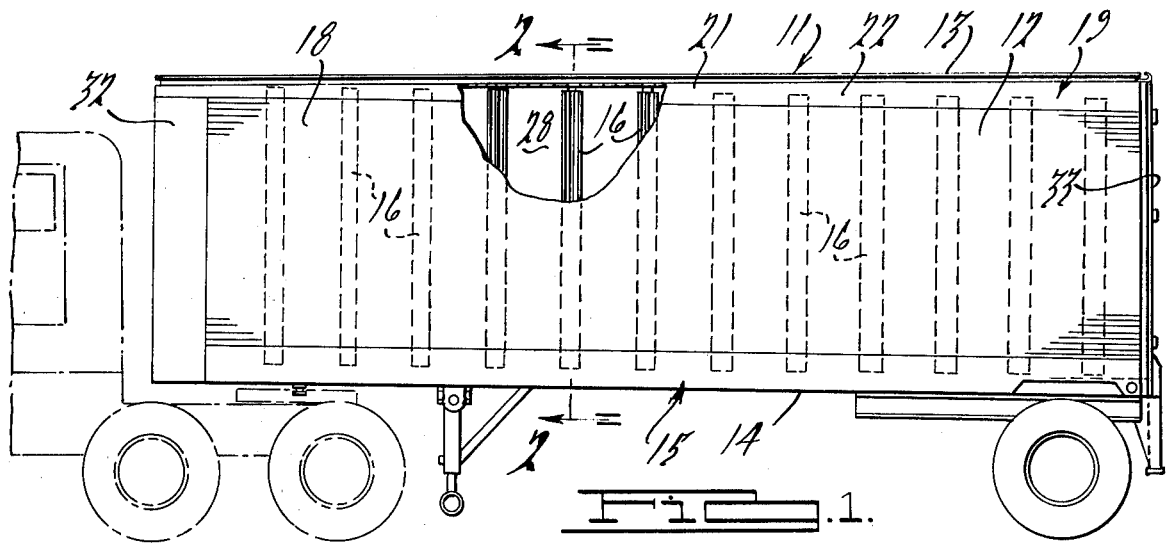
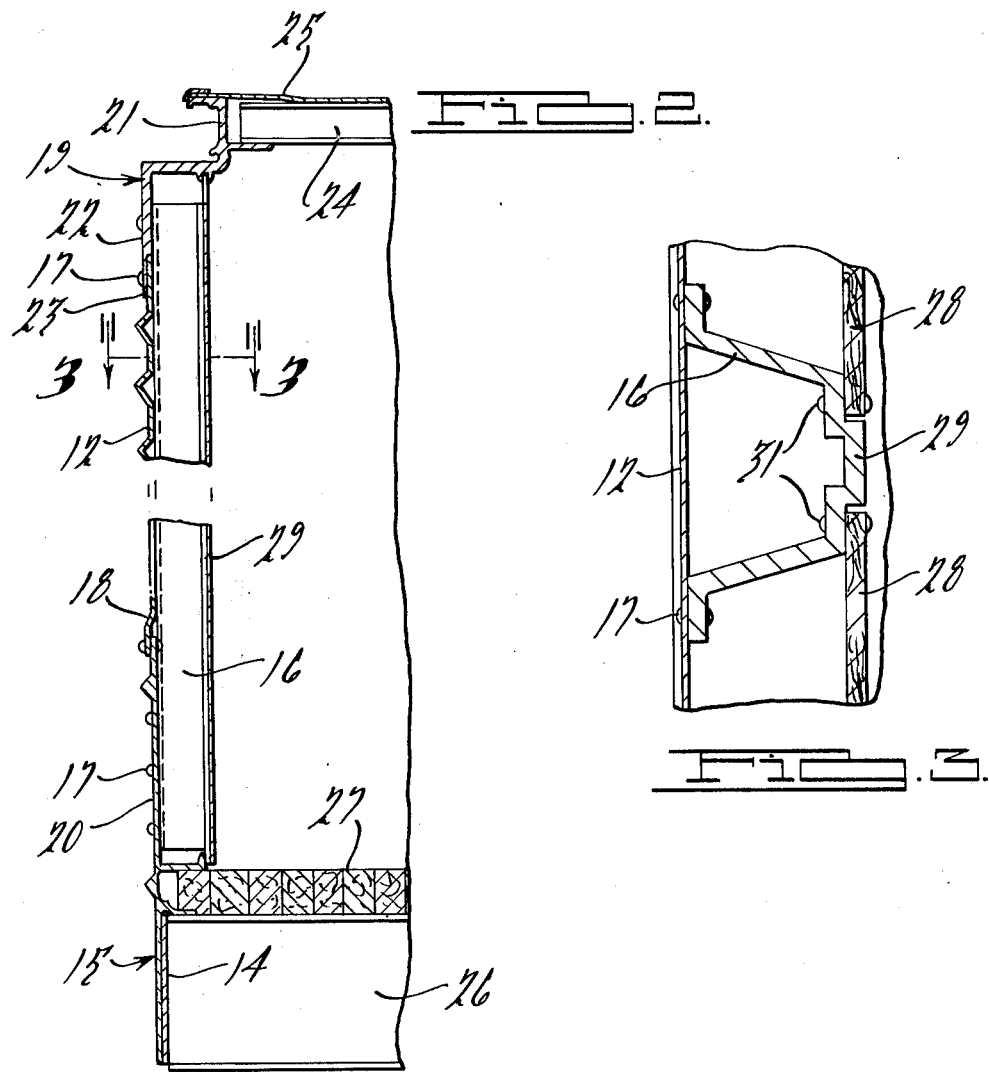

WEDGE TYPE TRAILER BODY

BACKGROUND OF THE INVENTION

Reference may be had to the patent to J. C. Bennett, U.S. Pat. No. 2,872,240 for "Trailer Van With Sloping Floor" as a disclosure of the prior art.

SUMMARY OF THE INVENTION

It has long been recognized that the trailer or semi-trailer body will have increased capacity if the floor is sloped to the rear while maintaining the roof in a horizontal plane. However, this type of body has heretofore proved costly to produce as it did not lend itself to mass production. The present body facilitates mass production by having an underframe structure supporting like side posts in right angle relation to the side rails thereof. An extruded aluminum top rail has a downwardly extending flange the lower edge of which is cut at an angle relative to the upper edge thereof whereby the lower edge is substantially parallel to the floor and to the top ends of the posts which are overlapped thereby. The door frame can be orientated parallel to the front wall and posts but preferably, as herein illustrated, is disposed at a right angle to the roof so as to be in a vertical plane which permits the doors to swing in the normal manner. The aforesaid construction readily lends itself to mass production.

BRIEF DESCRIPTION OF THE DRAWINGS

FIG. 1 is a broken view in side elevation of a semi-trailer embodying features of the present invention;

FIG. 2 is an enlarged broken sectional view of the structure illustrated in FIG. 1, taken on the line 2—2 thereof, and FIG. 3 is a sectional view of the structure illustrated in FIG. 2, taken on the line 3—3 thereof.

DESCRIPTION OF THE PREFERRED EMBODIMENT

A semi-trailer 11 has a body 12 with a roof 13 disposed in a horizontal plane and an underframe 14 which slopes rearwardly providing greater head room within the body at the rear than at the forward end. The underframe 14 at the sides has an extruded aluminum bottom rail 15 secured thereto with a flange 20 extending upwardly to which the bottom ends of a plurality of posts 16 are secured, as by rivets 17. Smooth or corrugated alluminum sheets 18 are also riveted to the posts to form the outside walls of the body. The posts 16 are of U-shape in cross section having edge flanges to which the sheets and extruded side rails are riveted. The posts are disposed in parallel relation and at right angles to the underframing 14. The posts are of the same length so that the top edges will terminate on a line which is parallel to the floor or the underframing.

In accordance with the present invention, a top rail extrusion 19 has an upper edge or a rail portion 21 and a downwardly extending flange 22 of substantial width so that it can be cut on an angle, from the front to the rear, which conforms to the angle that the underframing is disposed relative to a horizontal plane.

The edge of the flange 22 overlaps the top edge of the posts and the side sheets 18, as illustrated at 23 where rivets 17 secure the sheets to the flange 22 and to the side flanges of the posts 16. The top rails 21 have cross members 24 applied thereacross to which the aluminum sheets 25 of the roof are bonded. Cross members 26 extend between the sides of the underframing 14 on which a floor 27 of conventional construction is supported. The inner face of the posts supports plywood paneling 28 which extend between projecting webs 29 of the posts to provide a smooth surface when secured thereto by rivets 31. A front wall 32 may be made of steel to provide strength thereto and to which the side wall sheets 18 are secured. The front wall is disposed at right angles to the underframing and parallel to the posts 16.

The parallel relation of the front wall and the posts and the right angle relation to the underframing 14 permits standard production methods for building a trailer body to be utilized yet the use of the roof rail extrusions 21 orientates the upper surface of the roof in a horizontal plane. A rear door frame 33 of conventional construction is secured at the rear end of the body to be disposed in a vertical plane at right angles to the plane of the roof.

From the foregoing it should be apparent that conventional construction methods can be employed. The underframing is conventional, the right angle relationship of the posts, which are of the same length, to the underframing is conventional, and the orientation of the front wall to the underframing is conventional. The extruded top rail with a wedge shaped flange, while different, attaches to the posts in the normal manner yet orientates the roof in a horizontal plane. The roof is conventionally secured to the cross members between the roof rails. The door frame is preferably attached at the rear end of the body so as to be normally orientated to the roof and to a horizontal plane.

We claim:

1. In a wedge type trailer body to be mounted on front and rear wheels, an underframe having a lower rail at each side which slopes downwardly toward the rear when supported on the front and rear wheels, side walls comprising a plurality of spaced posts of substantially equal length extending upwardly from said lower side rails at right angles thereto, and a top rail at each side having a downwardly extending flange of a width to overlap the upper ends of said posts when the upper edge portion of said top side rails are disposed in a substantially horizontal plane and said lower side rails slope downwardly toward the rear.

2. A wedge type trailer body as recited claim 1, wherein a rear door frame is secured to the end of the body so as to be disposed in a vertical plane at right angles to the plane of the upper edge portion of said top side rails and at an angle to said lower side rails.

3. A wedge type trailer or semi-trailer body as recited in claim 1, wherein the bottom edge of said flanges has substantially the same slope as that of the side rails of the underframe.

4. A wedge type trailer in accordance with claim 1, including a front wall disposed at right angle to said lower side rails and at an angle with respect to the plane of the upper edge portion of said top side rails.

5. In a wedge type trailer body to be mounted on front and rear wheels, an underframe having a lower rail at each side which slopes downwardly toward the rear when supported on the front and rear wheels, side walls comprising a plurality of spaced posts of substantially equal length extending upwardly from said lower side rails at right angles thereto, and a top rail at each side comprising a lower edge portion with a downwardly extending flange of a width to overlap the upper ends of said posts and an upper edge portion disposed in a substantially horizontal plane when said lower side rails slope downwardly toward the rear.

6. In a wedge type trailer body to be mounted on front and rear wheels, an underframe which slopes downwardly toward the rear when supported on the front and rear wheels, side walls comprising upper and lower side rails, respectively, a plurality of spaced posts of substantially equal length extending fron one of said rails at right angles thereto, the other of said side rails having a vertically extending flange of a width to overlap the ends of said posts when the top edge of said upper side rail is disposed in a substantially horizontal plane and the bottom edge of said lower side rail slopes downwardly generally parallel to said underframe.

* * * * *